E. HAUGER.
AUTOMOBILE WHEEL.
APPLICATION FILED NOV. 2, 1915.
1,206,109.
Patented Nov. 28, 1916.
2 SHEETS—SHEET 1.
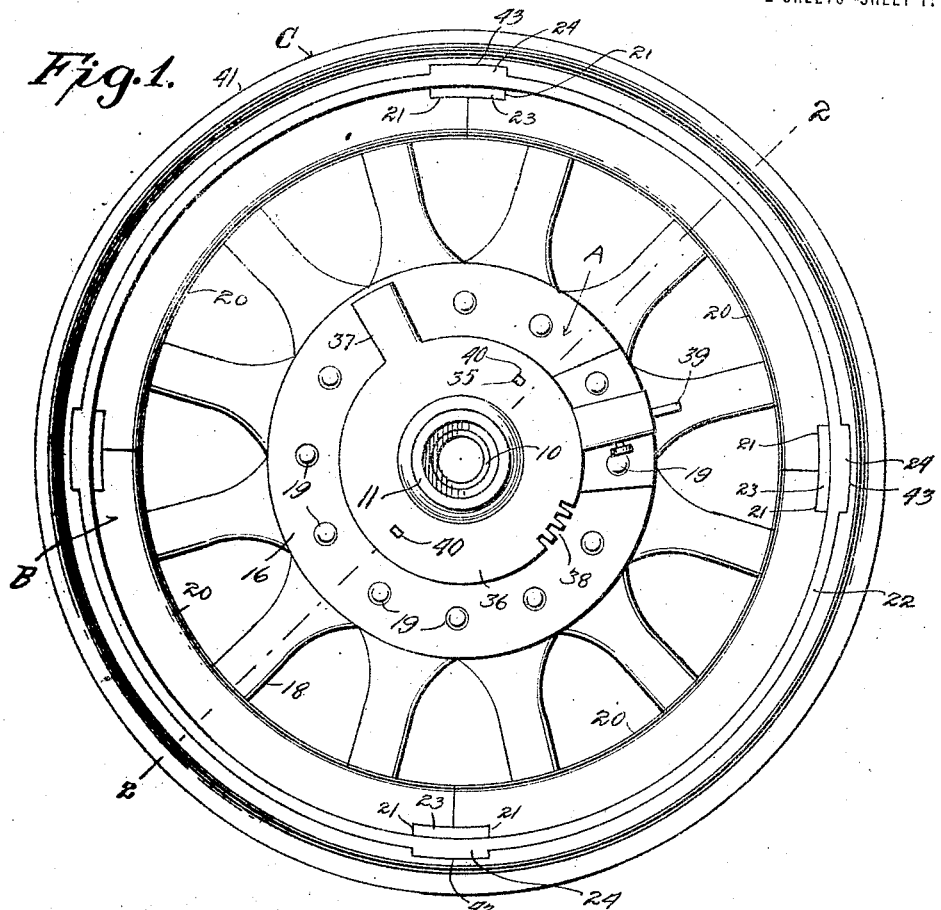
Fig. 1.
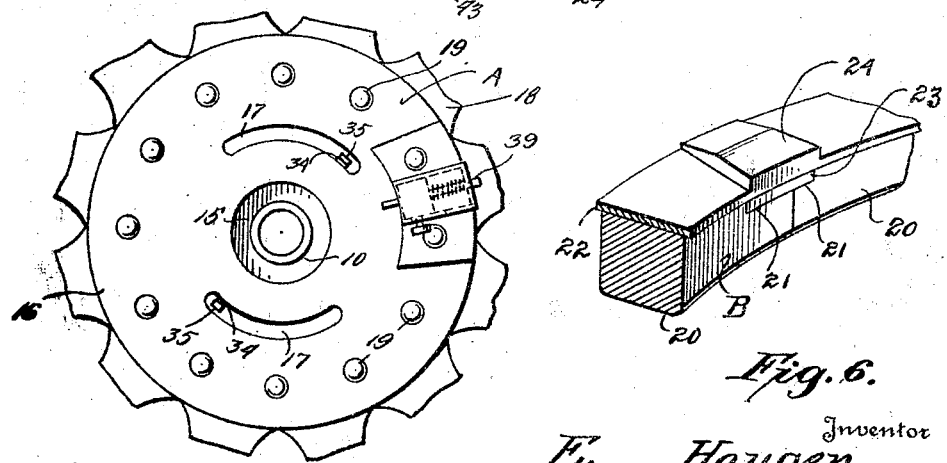
Fig. 5.
Fig. 6.
Witnesses
Inventor
E. Hauger
By
Attorneys

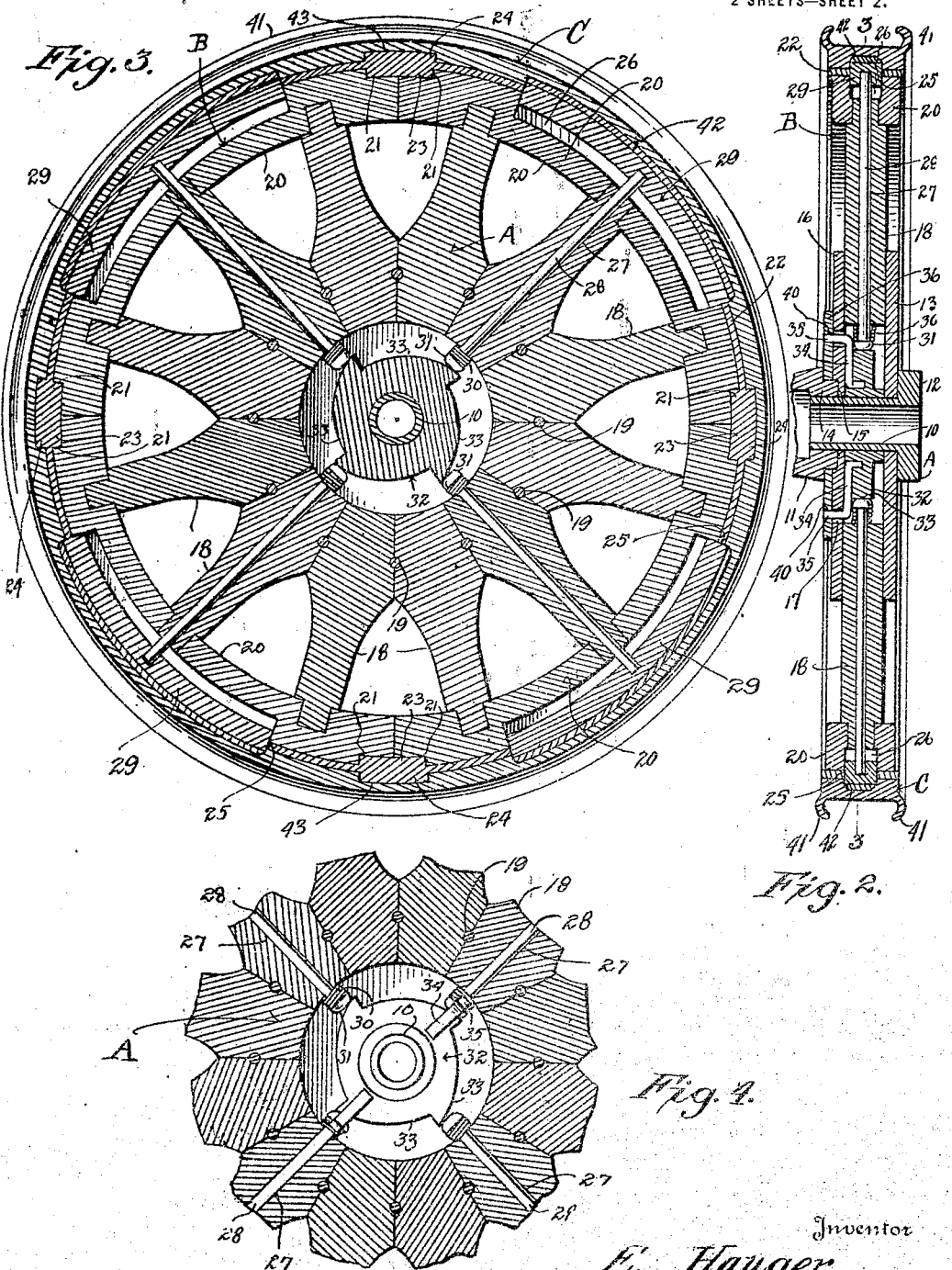

UNITED STATES PATENT OFFICE.

EDWARD HAUGER, OF SHELBURN, INDIANA.

AUTOMOBILE-WHEEL.

1,206,109.

Specification of Letters Patent.

Patented Nov. 28, 1916.

Application filed November 2, 1915. Serial No. 59,185

*To all whom it may concern:*

Be it known that I, EDWARD HAUGER, a citizen of the United States, residing at Shelburn, in the county of Sullivan, State of Indiana, have invented certain new and useful Improvements in Automobile-Wheels; and I do hereby declare the following to be a full, clear, and exact description of the invention, such as will enable others skilled in the art to which it appertains to make and use the same.

This invention relates to automobile wheels.

The object of the invention is to provide an automobile wheel embodying an improved mechanism for locking a demountable rim in operative association therewith, the construction of said locking mechanism being such as will greatly facilitate the application and removal of the demountable rim and efficiently lock the rim against lateral and circumferential displacement when applied.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of an automobile wheel constructed in accordance with the invention the pneumatic tire being omitted; Fig. 2, a section on the line 2—2 of Fig. 1; Fig. 3, a section on the line 3—3 of Fig. 2; Fig. 4, a view similar to Fig. 1 showing a fragment of the wheel with a spoke clamping plate removed; Fig. 5, a view similar to Fig. 4 with only the rotatable locking plate removed; and Fig. 6, a perspective view of a fragment of the felly rim.

Referring to the drawings the improved wheel is shown as comprising a hub A and this hub is formed of a tubular member 10 having fixed on one end thereof a hub cap 11 and on its other end a hub cap 12. Mounted on the tubular member 10 adjacent the hub cap 12 is a spoke clamping plate 13. The hub cap 11 comprises an inner reduced portion 14 which enters a recess 15 in a spoke clamping plate 16, the latter being fixed on the tubular member 10 and provided with slots 17 disposed respectively on opposite sides of the tubular member 10. Confined between the plates 13 and 16 are the inner ends of a plurality of spokes 18. These spokes are clamped between the plates 13 and 16 through the medium of bolts 19 passing through said plates and between adjacent spokes, the latter having their adjacent faces recessed to form the necessary passages to receive the bolts. Mounted on the outer ends of the spokes 18 is a felly B formed of a plurality of sections 20. The outer face of each section 20 at the ends of the section is cutaway to form recesses 21 for a purpose that will presently appear. Mounted on the felly B is a rim 22 having formed on its inner face a plurality of lugs 23 engaged in respective recesses 21 to secure the rim against circumferential displacement. Also formed on the outer face of the rim 22 is a plurality of lugs 24 for a purpose that will presently appear. The rim 22 between the lug 24 is provided with circumferential slots 25 which register with recesses 26 formed in the outer face or periphery of the felly B. Certain of the spokes 18, the number corresponding to the number of recesses 26, are provided with longitudinal passages 27. Slidable in each passage 27 is a rod 28 the outer end of which carries a locking shoe 29 which seats in the related recess 26, said shoe being held seated in said recess by a spring 30 encircling the related rod 28 and bearing at one end against a head 31 on the inner end of the rod at its other end against the inner end of the related spoke.

Rotatably mounted on the tubular member 10 between the plates 13 and 16 is a member 32 having its periphery formed of a plurality of cam surfaces or faces 33 corresponding in number to the rods 28 and adapted during its rotation in one direction to cause the cam faces 33 to engage the heads 31 respectively so as to move the rods 28 longitudinally and force the shoes 29 outwardly of the rim 22. Fixed on the member 32 are arms 34 disposed diametrically opposite and having their free ends bent laterally as at 35 and engaged through respective slots 17. Rotatably mounted on the reduced portion 14 of the hub cap 11 is a substantially circular cap 36 including a laterally directed operating handle 37 and having its periphery provided with a plurality of notches 38 with which latter a spring pawl 39 mounted on the plate 13 is adapted to coöperate to lock the plate 36 against rotation. This plate 36 is also provided with openings 40 which receive the free ends of the arms 34 and whereby rotation of the plate 36 will effect rotation of the member 32 to operate the shoes 29 to locking position.

Engaged on the rim 22 is a demountable rim C embodying the usual clencher flanges 41 and having provided on its inner face recesses 43 adapted to detachably receive the lugs 24 and also with recesses 42 adapted to receive the locking shoes 29 when the latter are in locking position. By providing the lugs 24 and recesses 43 proper positioning of the recesses 42 with respect to the shoes 29 is assured. It will be obvious that when the shoes 29 are operated into the recesses 43 the rim C will be locked against both lateral and circumferential displacement. To remove the rim it is only necessary to rotate the member 32 through the medium of the plate 36 in such direction as will allow the shoes 29 to be moved into the recesses 26 under the influence of the springs 30.

What is claimed is:—

1. In a wheel structure, the combination of a hub, a tubular member, spaced clamping plates mounted on the member, spokes having their inner ends secured between the plates, a felly mounted on the outer ends of said spokes, longitudinal rods slidable in certain of said spokes, a locking shoe on the outer end of each rod adapted to seat in a recess in the periphery of the felly, a demountable rim mounted on the felly and provided with recesses to receive said locking shoes, normally holding the locking shoes in the recesses in the felly, and means for simultaneously moving said locking shoes into the recesses in the demountable rim to secure the latter against lateral or circumferential displacement with respect to the felly.

2. In a wheel structure, the combination of a hub, a tubular member, spaced clamping plates mounted on the member, spokes having their inner ends secured between the plates, a felly mounted on the outer ends of said spokes, longitudinal rods slidable in certain of said spokes, a locking shoe on the outer end of each rod adapted to seat in a recess in the periphery of the felly, a demountable rim mounted on the felly and provided with recesses to receive said locking shoes, means normally holding the locking shoes in the recesses in the felly, a rotatable member mounted on the tubular member and adapted during its rotation to coöperate with the inner ends of the rods and move the latter longitudinally to position the locking shoes in the recesses of the demountable rim, means for rotating said member, and means for locking said member against rotation.

In testimony whereof, I affix my signature, in the presence of two witnesses.

EDWARD HAUGER.

Witnesses:
CHAS. E. BOYD,
WM. L. LAURENT.